(12) United States Patent
Niwa (10) Patent No.: US 10,471,855 B2
(45) Date of Patent: Nov. 12, 2019

(54) CUSHION FRAME

(71) Applicant: TOYOTA BOSHOKU KABUSHIKI KAISHA, Aichi (JP)

(72) Inventor: Masayuki Niwa, Bangkok (TH)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 0 days.

(21) Appl. No.: 15/899,454

(22) Filed: Feb. 20, 2018

(65) Prior Publication Data

US 2018/0236902 A1 Aug. 23, 2018

(30) Foreign Application Priority Data

Feb. 17, 2017 (JP) .................. 2017-028208

(51) Int. Cl.
| | |
|---|---|
| *B60N 2/16* | (2006.01) |
| *B60R 22/26* | (2006.01) |
| *B60N 2/68* | (2006.01) |
| *B60N 2/07* | (2006.01) |
| *B60R 22/18* | (2006.01) |

(52) U.S. Cl.
CPC ............. *B60N 2/16* (2013.01); *B60N 2/0732* (2013.01); *B60N 2/68* (2013.01); *B60N 2/682* (2013.01); *B60N 2/688* (2013.01); *B60R 22/26* (2013.01); *B60R 2022/1806* (2013.01)

(58) Field of Classification Search
CPC .......... B60N 2/16; B60N 2/0732; B60N 2/68; B60N 2/1615; B60N 2/0702; B60N 2/0705; B60N 2/07; B60R 22/22; B60R 22/26; B60R 2022/1806
USPC .................................................... 297/344.12
See application file for complete search history.

(56) References Cited

U.S. PATENT DOCUMENTS

| | | | | | |
|---|---|---|---|---|---|
| 4,818,022 | A * | 4/1989 | Nishimura | ............... | B60N 2/06 280/804 |
| 5,102,197 | A * | 4/1992 | Itsuki | ...................... | B60R 22/26 297/468 |
| 5,152,552 | A * | 10/1992 | Ikegaya | .............. | B60R 22/1958 280/806 |
| 5,848,775 | A * | 12/1998 | Isomura | ................. | B60N 2/067 248/430 |
| 6,356,200 | B1 * | 3/2002 | Hamada | ................. | B60N 2/002 177/144 |
| 6,974,192 | B2 * | 12/2005 | Miwa | ..................... | B60N 2/002 177/144 |

(Continued)

FOREIGN PATENT DOCUMENTS

JP 2015-214329 12/2015

*Primary Examiner* — Mark R Wendell
(74) *Attorney, Agent, or Firm* — Greenblum & Bernstein, P.L.C.

(57) ABSTRACT

A cushion frame for a conveyance seat is provided. The cushion frame comprises a first and a second side frame; a connecting member that couples the first side frame to the second side frame; a fixing bracket that comprises a first and a second fixing part; and a belt anchor that is disposed in the fixing bracket and is coupled to a seat belt. The first fixing part comprises a first plate-surface that is substantially parallel to a seat-width axis. The second fixing part comprises a second plate-surface that is substantially perpendicular to the first plate-surface and is situated in the opposite side of the second side frame across the first side frame. The belt anchor is fixed to the second fixing part.

9 Claims, 7 Drawing Sheets

(56) References Cited

U.S. PATENT DOCUMENTS

| | | | |
|---|---|---|---|
| 7,658,443 B2* | 2/2010 | Musale | B60N 2/1615 297/216.1 |
| 9,718,386 B2 | 8/2017 | Hayashi | |
| 2014/0374563 A1* | 12/2014 | Tuji | B60N 2/067 248/429 |
| 2015/0307006 A1 | 10/2015 | Hayashi | |

* cited by examiner

CUSHION FRAME

CROSS-REFERENCE TO RELATED APPLICATIONS

This application claims the benefit of Japanese Patent Application No. 2017-028208 filed Feb. 17, 2017 in the Japan Patent Office, the entire disclosure of which is incorporated herein by reference.

BACKGROUND

The present disclosure relates to a cushion frame for a conveyance seat.

A cushion frame is a frame of a seat cushion that supports the buttocks of an occupant. For example, Japanese Unexamined Patent Application Publication 2015-214329 discloses a cushion frame that comprises two side frames, and a connecting pipe for connecting the two side frames to each other.

Each of the two side frames is fixed to a movable rail of a sliding-rail mechanism via a connecting bracket. The sliding-rail mechanism is fixed to the floor panel or other part of a vehicle and supports the cushion frame so that the cushion frame is slidable.

The connecting brackets are respectively fixed to the side frames in the inner side of the side frames. The inner side of the side frames is a space between the two side frames. In addition, a belt anchor pin that is coupled with a seat belt is disposed in an anchor bracket that is fixed to the movable rail.

SUMMARY

Preferably, one aspect of the present disclosure provides a structure of a cushion frame that allows the position of the cushion frame to be lowered compared with conventional cushion frames and requires no anchor bracket.

In the present disclosure, the cushion frame comprises a connecting member that extends along a seat-width axis and couples a first side frame to a second side frame; a fixing bracket that comprises a first fixing part that is fixed to a conveyance, and a second fixing part that is coupled to the first side frame; and a belt anchor that is disposed in the fixing bracket.

The first fixing part comprises a first plate-surface that is substantially parallel to the seat-width axis. The second fixing part comprises a second plate-surface that is substantially perpendicular (substantially vertical) to the first plate-surface and is situated in the opposite side of the second side frame across the first side frame. The belt anchor is disposed in the second fixing part, in a substantially width direction.

It is generally difficult to reduce the height of the fixing bracket, specifically the height of the second fixing part, if the fixing bracket is situated in the inner side of the side frame, in other words, in the same side of the first side frame as the second side frame is situated.

In contrast, it is generally less difficult to reduce the height of the fixing bracket if the fixing bracket is disposed in the outer side of the side frame that is the opposite side of the second side frame across the first side frame.

In addition, since the belt anchor is disposed in the second fixing part, in other words, to the fixing bracket, there is no anchor bracket that serves solely to fix a belt anchor pin in the present disclosure. The number of components can therefore be reduced in the present disclosure.

It is accordingly impossible to cause the fixing bracket to interfere with, for example, an anchor bracket when the height of the fixing bracket is reduced. Due to these reasons, the position of the cushion frame can be lowered in the present disclosure compared with the position of conventional cushion frames while reducing the number of components.

The present disclosure may be configured as described below.

Desirably, a mechanical fastener to couple the first fixing part to the conveyance is situated in the same side of the first side frame as the second side frame is situated.

Desirably, the first side frame comprises, in a lower end area of the first side frame, a protrusion that protrudes towards the second side frame and extends along a front-rear axis of the seat. This enables an improvement in mechanical strength of the first side frame without concern such as an interference between the first side frame and the fixing bracket.

Desirably, the second fixing part is indirectly coupled to the first side frame via the connecting member. This enables the fixing bracket to be easily coupled to the first side frame.

Desirably, the connecting member comprises a connecting rod that indirectly couples the first side frame to the second side frame, and a connecting collar that is coupled to a first end of the connecting rod and couples the second fixing part to the first side frame.

This enables the connecting member to be used for various cushion frames with various specifications by merely replacing the connecting collar.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawing are made for easy understanding of relationship between each drawing. Arrows and other marks (directions) labelled on each drawing do not limit the scope of the present disclosure.

1. Outline of Cushion Frame

Figure 1:
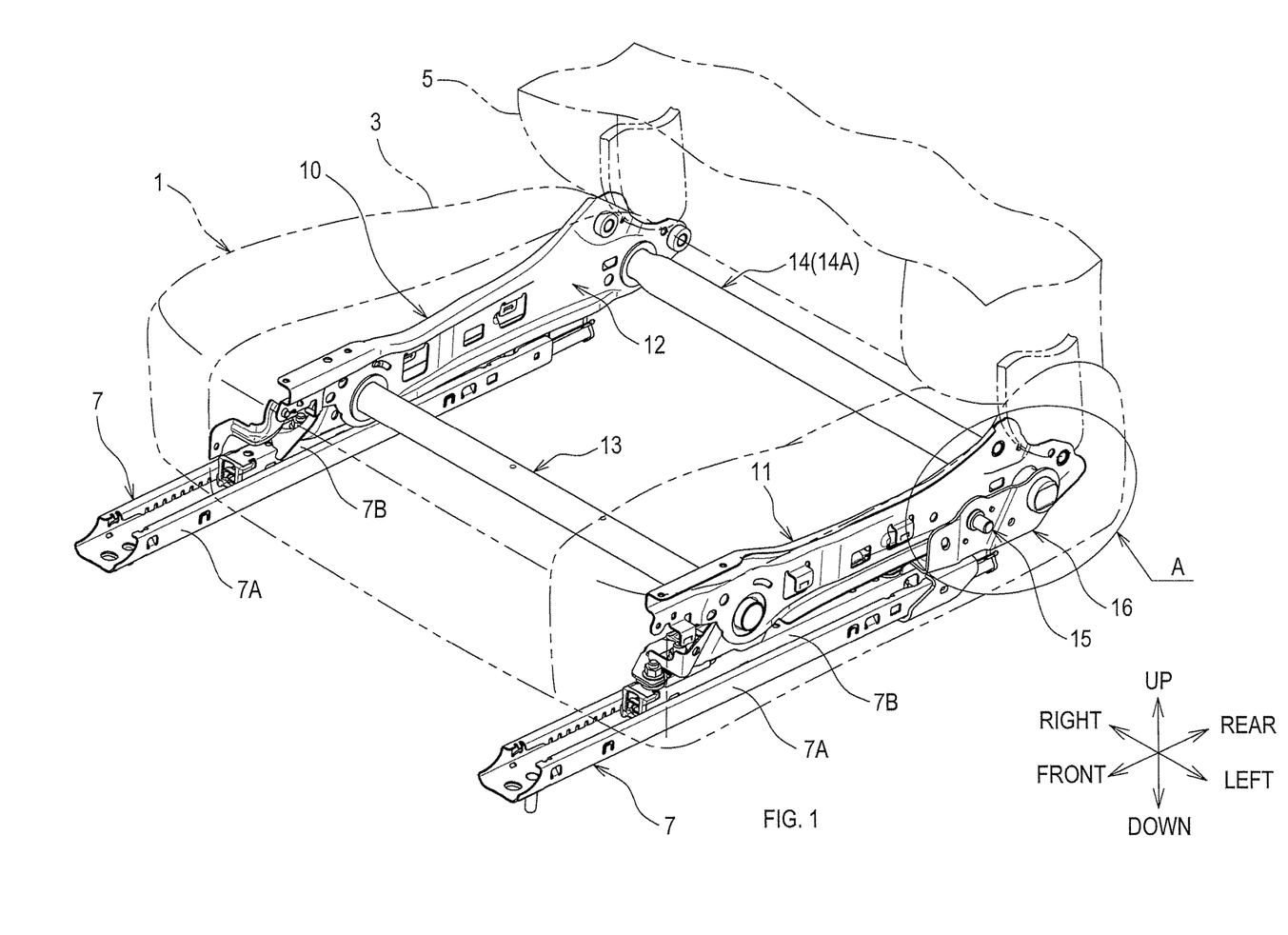
FIG. 1 is a perspective view of a cushion frame according to an embodiment of the present disclosure.

The present embodiment explains an example of a cushion frame 10 that is used for a conveyance seat 1 as shown in FIG. 1. The conveyance seat 1 comprises a seat cushion 3, and a seatback 5.

The seat cushion 3 supports the buttocks of an occupant. The seatback 5 supports the back of the occupant. The cushion frame 10 is a frame of the seat cushion 3. The conveyance seat 1 is fixed to a floor panel of a conveyance via the cushion frame 10.

The cushion frame 10 is fixed to the conveyance via two sliding devices 7R and 7L (right sliding device 7R and left sliding device 7L). Each of the sliding devices 7R and 7L comprises a fixed rail 7A, and a movable rail 7B. The fixed rail 7A is fixed to the conveyance. The movable rail 7B is fixed to the cushion frame 10 and can be displaced by sliding relative to the corresponding (left or right) fixed rail 7A.

2. Configuration of Cushion Frame

As shown in FIG. 1, the cushion frame 10 comprises a first side frame 11, a second side frame 12, a front connecting member 13, and a rear connecting member 14. The first side frame 11 is disposed in a left side of the seat in the present embodiment and extends along the front-rear axis of the seat. Note, the "first" side refers to the left side in the embodiment of FIG. 1, but may refer to a right side in a different embodiment, especially a different embodiment that is a mirror image.

The second side frame 12 is disposed in a right side of the seat in the present embodiment and extends along the front-rear axis of the seat. The front and rear connecting members 13 and 14 each extend along the width axis of the seat (seat-width axis) and each couple the first side frame 11 to the second side frame 12.

The first and second side frames 11 and 12 each are substantially vertical and extend longitudinally from their respective front (first) end to rear (second) end, and along their direction of extension, their front side each are situated in a first longitudinal-end area of the seat (front side of the seat in the present embodiment). The second end of each of the first and second side frames 11 and 12, along their direction of extension, is situated in a second longitudinal-end area of the seat (rear side of the seat in the present embodiment). The front connecting member 13 couples the first side frame 11 to the second side frame 12 in the front area of the seat. The rear connecting member 14 couples the first side frame 11 to the second side frame 12 in the rear area of the seat.

Figure 2:
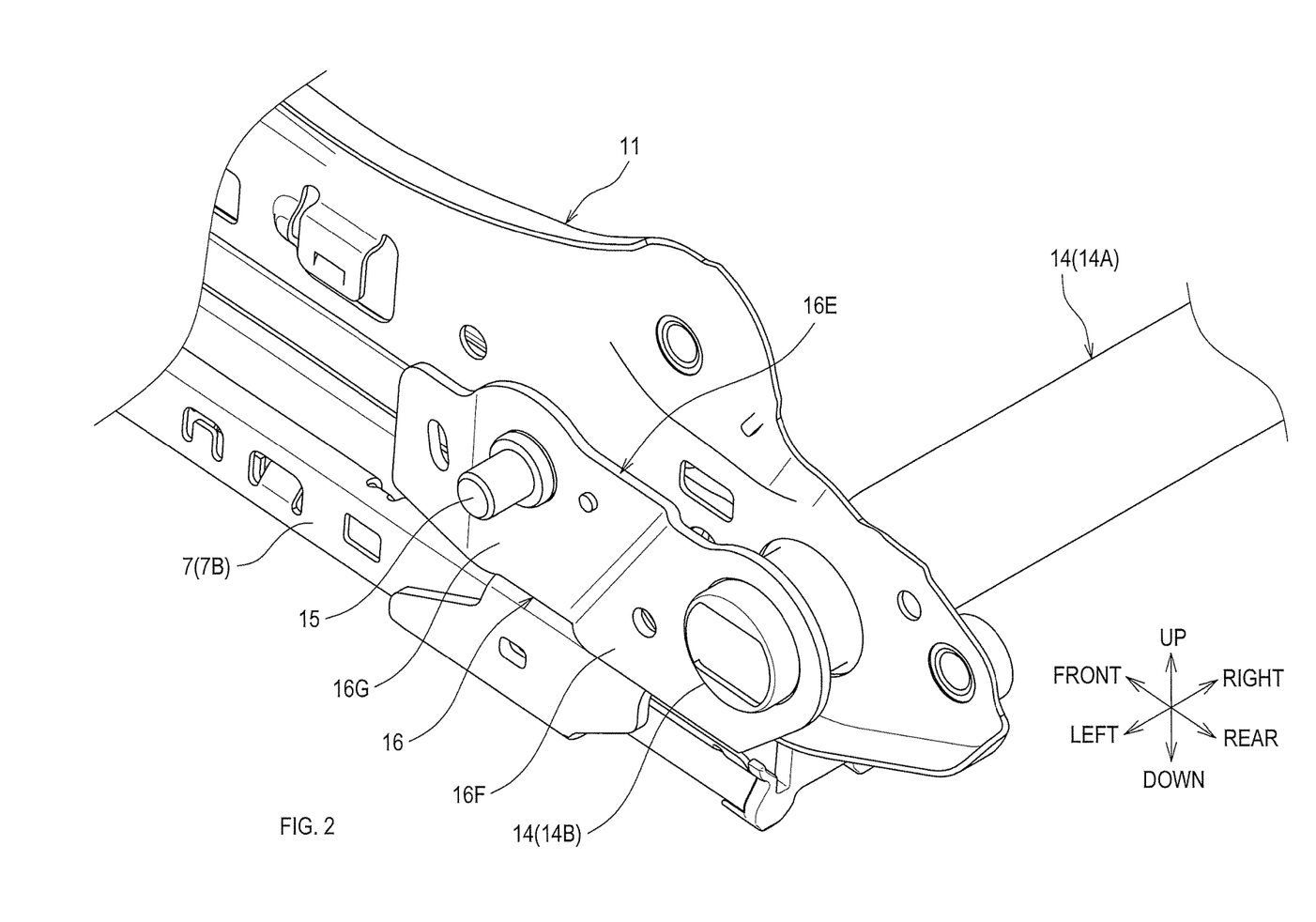
FIG. 2 is an enlarged view of an area A of FIG. 1.

As shown in FIG. 2, a belt anchor 15 is disposed in the rear left area of the seat. The belt anchor 15 is coupled to a seat belt (not shown) and is subjected to a tension force by the seat belt.

The seat belt comprises a tongue-side belt that is coupled to a tongue plate (not shown), and a buckle-side belt that is coupled to a buckle (not shown). The belt anchor 15 is coupled to the buckle-side belt.

3. Fixing Bracket

Figure 4:
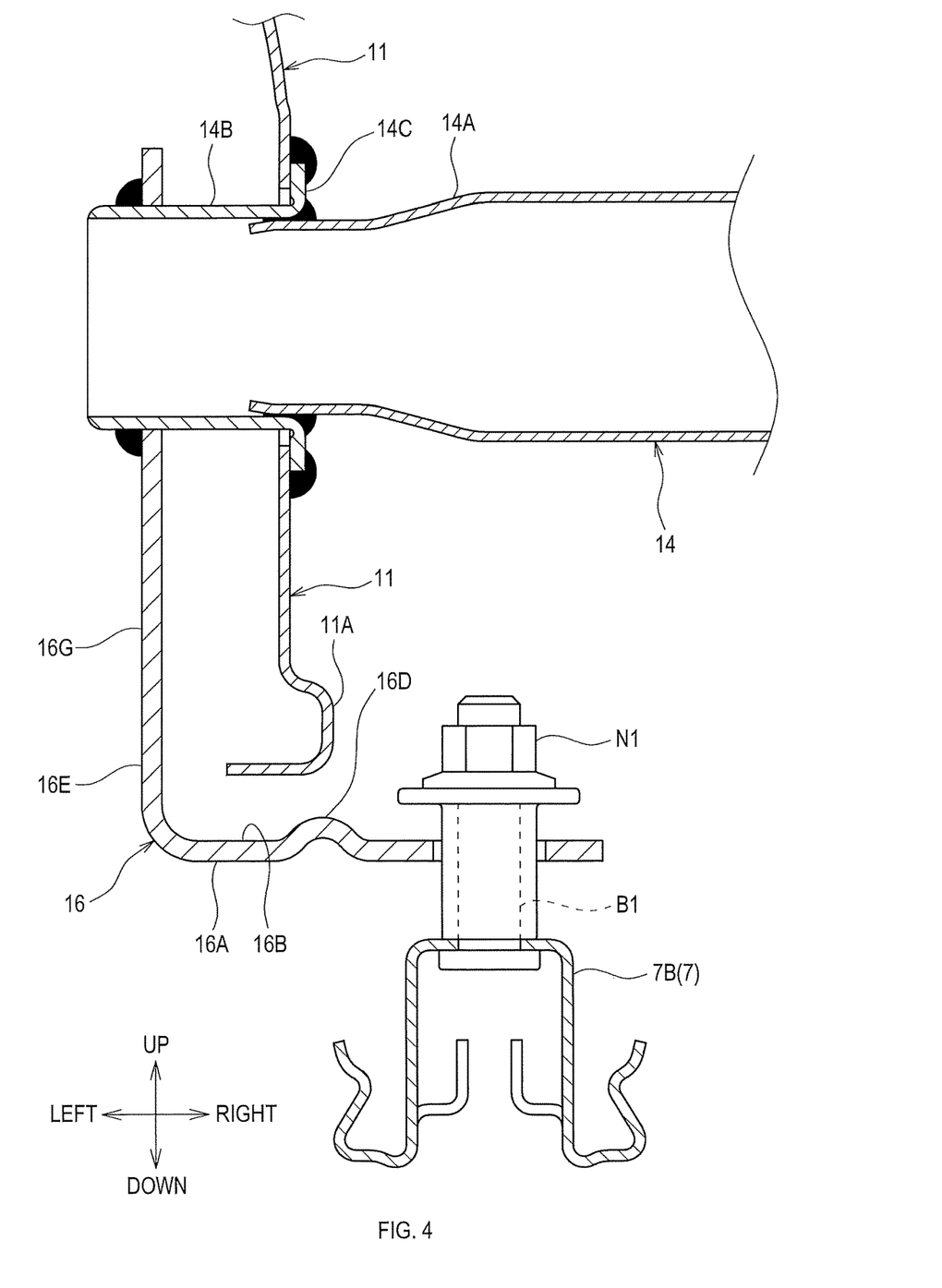
FIG. 4 is a frontward view of a cross section of an embodiment, wherein the cross section is a plane orthogonal to the front-rear direction.
Figure 5:
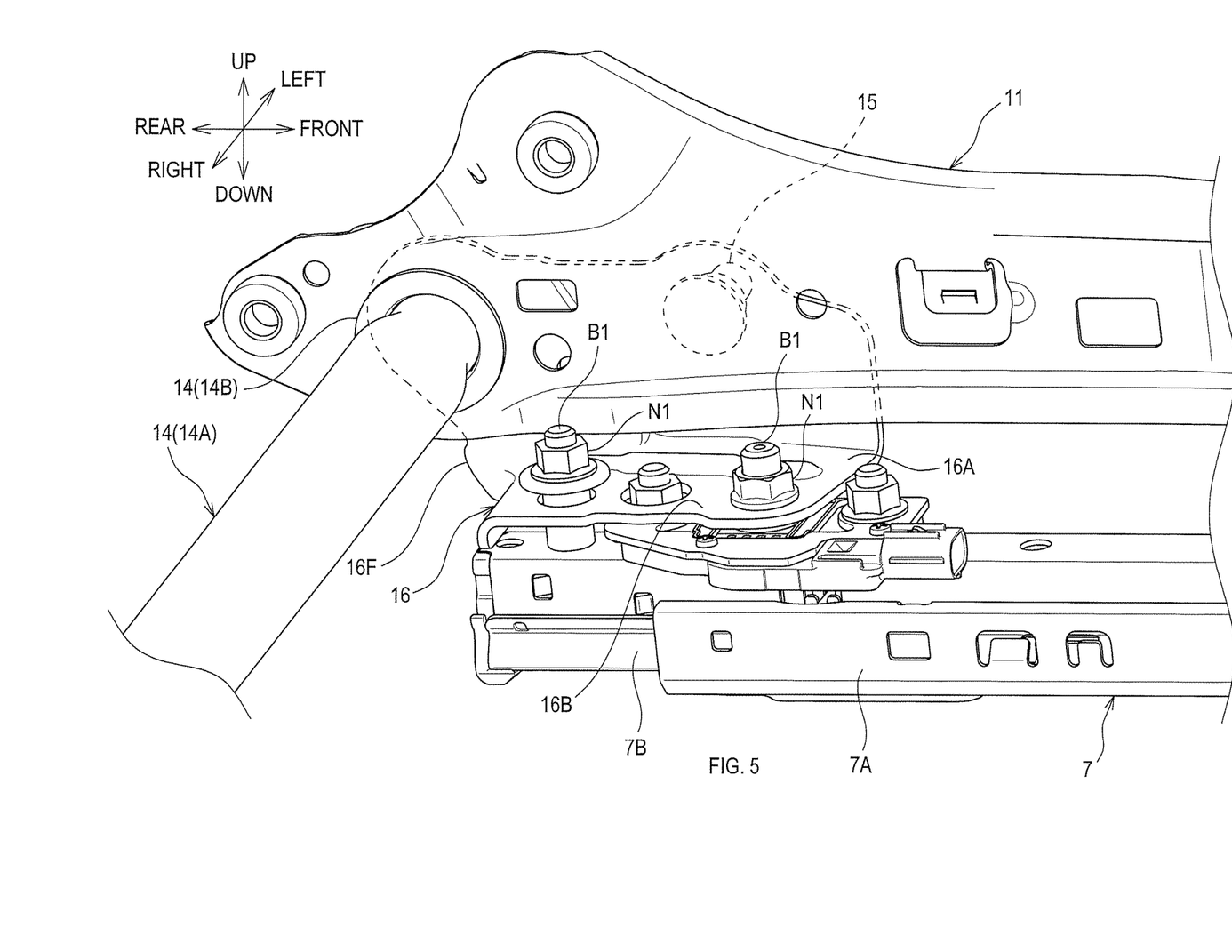
FIG. 5 is a diagram showing a fixing structure of a fixing bracket according to the embodiment of the present disclosure.

The belt anchor 15 is fixed to a fixing bracket 16, preferably by welding. As shown in FIG. 4, the fixing bracket 16 comprises a first fixing part 16A (substantially horizontal) and a second fixing part 16E (substantially vertical). As shown in FIG. 5, the first fixing part 16A is indirectly fixed to the conveyance via the left sliding device 7L.

The first fixing part 16A includes a first plate-surface 16B that is substantially parallel to the seat-width axis (horizontal). The first plate-surface 16B comprises through-holes 16C for fixing bolts B1 to pass through (see, FIG. 6); the fixing bolts B1 are disposed on the movable rail 7B.

Figure 6:
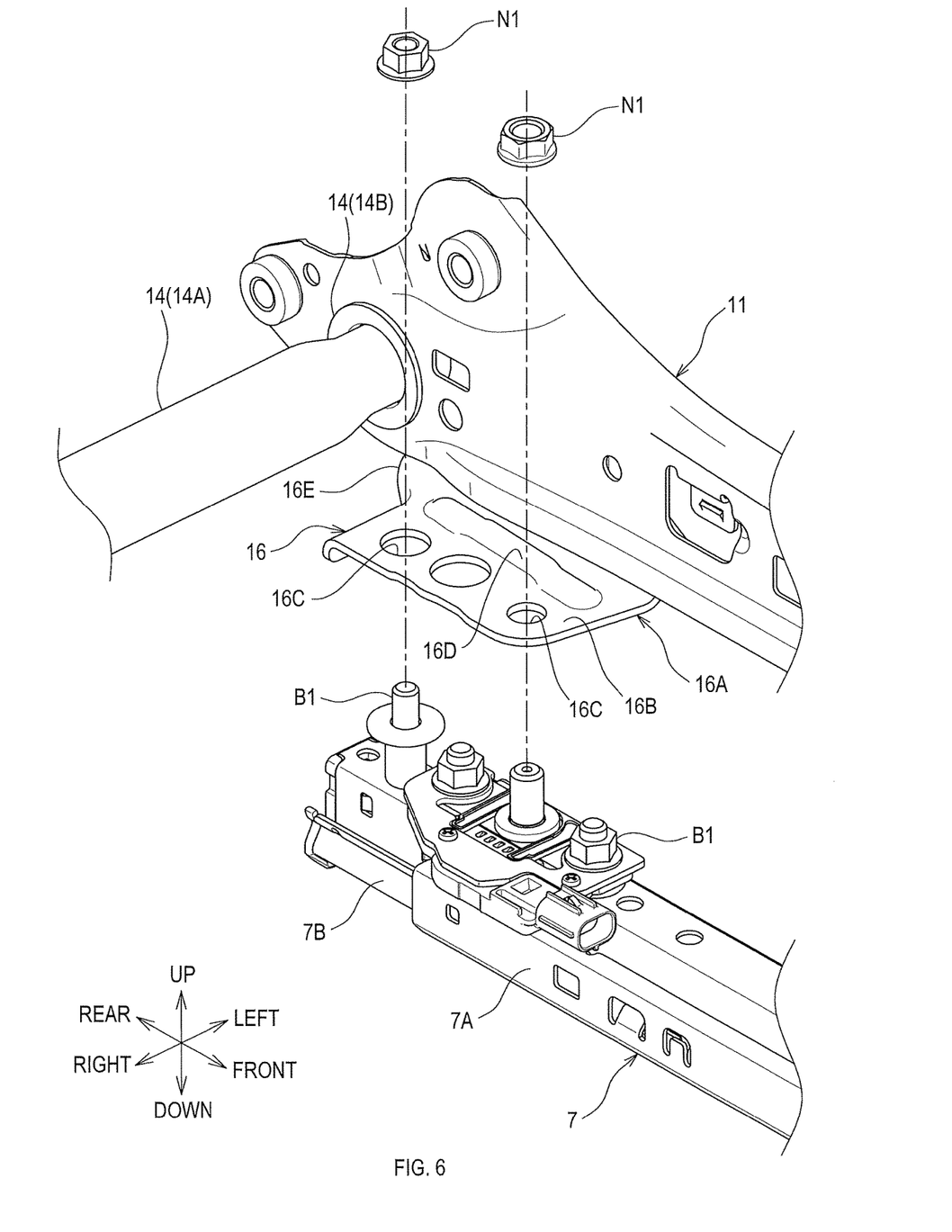
FIG. 6 is an exploded perspective view of the fixing structure of the fixing bracket according to the embodiment of the present disclosure.

A nut N1 is screwed down each of the fixing bolts B1. The first fixing part 16A, in other words the first plate-surface 16B, is accordingly fixed to the movable rail 7B. The nuts N1 and the fixing bolts B1 are examples of mechanical fasteners to fix the first fixing part 16A to the movable rail 7, and thus indirectly to the vehicle.

As shown in FIG. 4, the nuts N1 and the fixing bolts B1 are situated in the same side of the first side frame 11 as the second side frame 12 is. In other words, the nuts N1 and the fixing bolts B1 are situated in the opposite side of the second fixing part 16E of the fixing part 16 across the first side frame 11.

The first plate-surface 16B comprises a reinforcement 16D that enhances rigidity of the first plate-surface 16B. The reinforcement 16D is preferably a protrusion that extends along the front-rear axis of the seat and is formed by bulging a part of the first plate-surface 16B substantially perpendicularly to the first plate-surface 16B (bulging vertically upwards or downwards, e.g. see FIG. 6).

Figure 3:
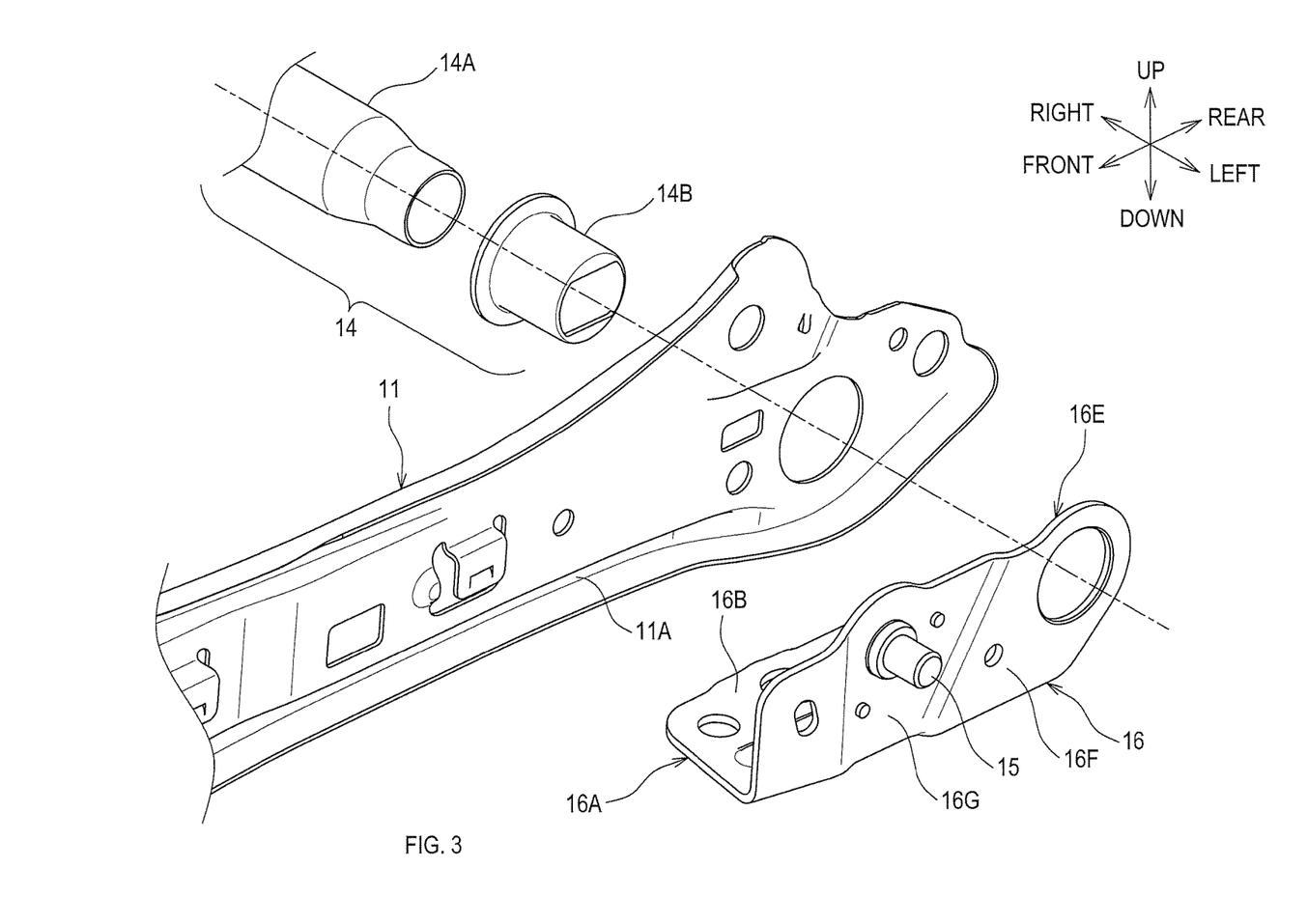
FIG. 3 is an exploded perspective view of FIG. 2.

As shown in FIG. 4, the second fixing part 16E is indirectly fixed to the first side frame 11 via the connecting collar 14B of the rear connecting member 14. As shown in FIG. 3, the second fixing part 16E comprises a second plate-surface 16F that is substantially perpendicular to the first plate-surface 16B.

As shown in FIG. 4, the fixing bracket 16 has a substantially L-shaped cross section, in which the first plate-surface 16B is situated lower than the lower end of the first side frame 11 and substantially perpendicularly to the second plate-surface 16F.

The first side frame 11 comprises, in its lower end area, a protrusion 11A that protrudes to bulge towards the second side frame 12, which is towards the nuts N1. As shown in FIG. 3, the protrusion 11A extends along the front-rear axis of the seat along the lower end of the first side frame 11. The protrusion 11A may be shaped in a channel, as shown, with the protrusion bulging inwardly (rightward in FIG. 4), and with a horizontal bottom side of the channel pointing outwardly (leftward in FIG. 4).

The second plate-surface 16F is situated in the opposite side of the second side frame 12 across the first side frame 11, in other words, situated in the opposite side of the nuts N1 and the fixing bolts B1, on the seat-width axis, across the first side frame 11.

The belt anchor 15 is disposed in a dented portion 16G of the second plate-surface 16F. The dented portion 16G is (inwardly) offset from the rest of the area of the second plate-surface 16F along the seat-width axis, creating a stage on the second plate-surface 16F. The dented portion 16G can increase the moment of inertia of area (rigidity) of the second plate-surface 16F.

For example, the first plate-surface 16B, the second plate-surface 16F, and the reinforcement 16D, are integrally formed from a metal sheet by plastic working, such as press working. Similarly, the protrusion 11A is integrally formed with the first side frame 11 by press working or other plastic working methods.

4. Structure of Connecting Member

As shown in FIG. 3, the rear connecting member 14 comprises a connecting rod 14A and a connecting collar 14B (and a right connecting collar, not shown). The connecting rod 14A couples the first side frame 11 to the second side frame 12. The connecting rod 14A is a metallic pipe.

As shown in FIG. 4, the connecting collar 14B is a cylindrical member that is coupled to a first end of the connecting rod 14A and couples the second fixing part 16E to the first side frame 11. A flange 14C is disposed in a first axial-end of the connecting collar 14B.

The flange 14C of the connecting collar 14B is fixed, by welding, to a first (right-side) surface of the first side frame 11 that faces the second side frame 12. The first axial-end of the connecting collar 14B is additionally fixed to the connecting rod 14A by welding. A second axial-end of the connecting collar 14B is fixed to the fixing bracket 16 by welding.

5. Feature of Cushion Frame in Present Embodiment

It is generally difficult to reduce the height of the fixing bracket 16, specifically the height of the second fixing part 16E, if the fixing bracket 16 is situated in the inner side (right side) of the first side frame 11, in other words, in the same side of the first side frame 11 as the second side frame 12 is situated.

For example, since the protrusion 11A is disposed in the lower end area of the first side frame 11 in the present embodiment, the protrusion 11A may interfere with the fixing bracket 16 if the bulge of the protrusion 11A is large. In other words, in the present embodiment, the height of the fixing bracket 16 cannot be easily reduced if the fixing bracket 16 is disposed on the inner side of the first side frame 11.

In contrast, it is generally less difficult to reduce the height of the fixing bracket 16 if the fixing bracket 16 is disposed on the outer side of the two side frames, in other words, the opposite side of the second side frame 12 across the first side frame 11, than when the fixing bracket 16 is disposed on the inner side of the first side frame 11.

In addition, since the belt anchor 15 is fixed to the second fixing part 16E, in other words, to the fixing bracket 16, there is no dedicated anchor bracket that serves solely to fix a belt anchor pin in the present embodiment.

Accordingly, it is essentially impossible to cause the fixing bracket 16 to interfere with, for example, an anchor bracket when the height of the fixing bracket 16 is reduced. Due to the reasons explained above, the position of the cushion frame 10 can therefore be lowered in the present embodiment compared with conventional cushion frames. Also, since a dedicated anchor bracket is not required, the number of components can be reduced.

Figure 7:
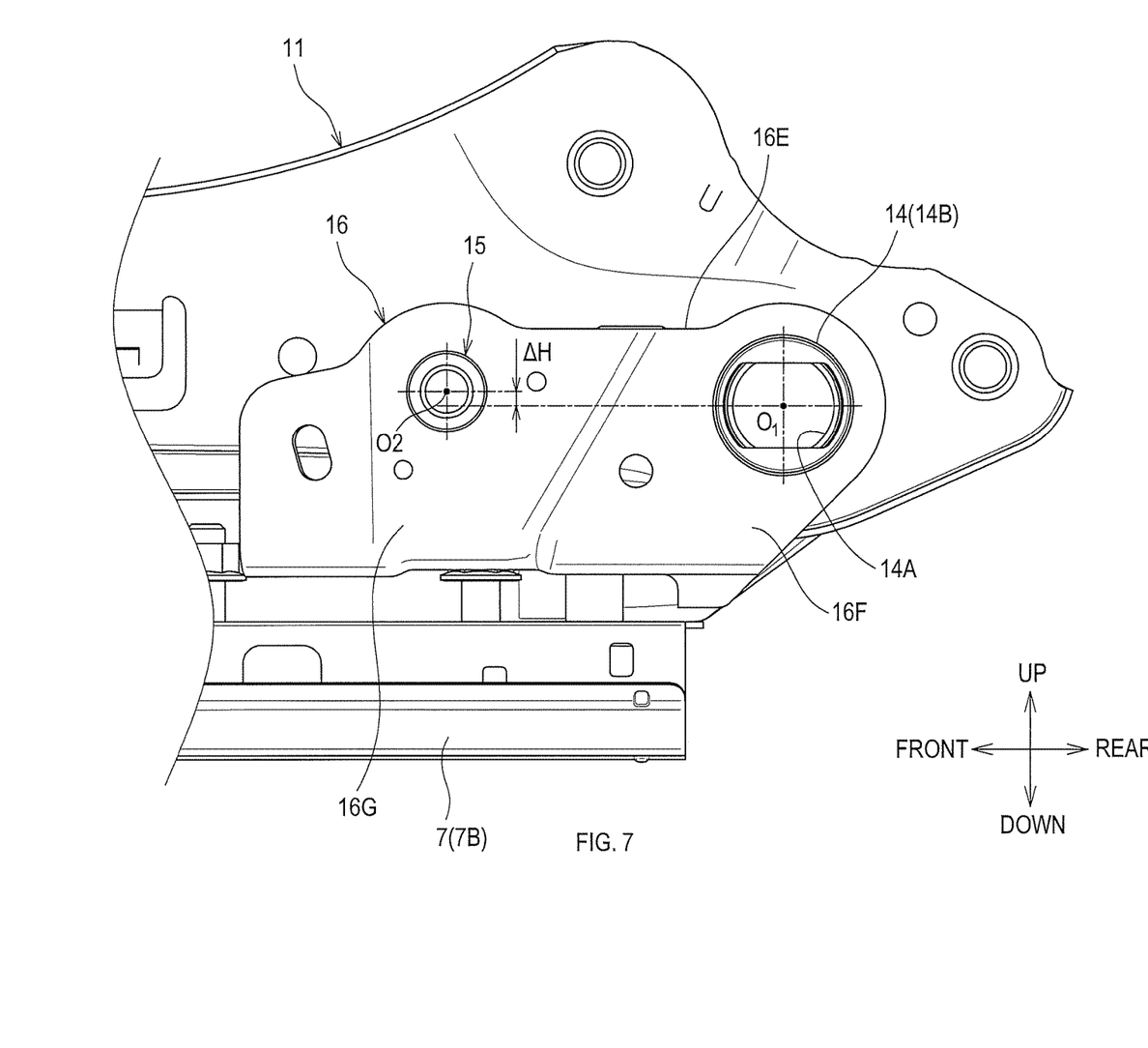
FIG. 7 is a left side view of the area A of FIG. 1, showing the rear connecting member.

As shown in FIG. 7, the center O1 of the rear connecting member 14 is situated slightly lower than the center O2 of the belt anchor 15 by a distance ΔH in the present embodiment.

In addition, the first side frame 11 comprises, in its lower end area, the protrusion 11A that protrudes towards the second side frame 12 and extends along the front-rear axis of the seat. Therefore, as shown in FIG. 4, mechanical strength of the first side frame 11 can be improved without concern such as an interference between the first side frame 11 and the fixing bracket 16.

If the fixing bracket 16 is disposed in the same side (right side) of the first side frame 11 as the second side frame 12 is situated, the size of the bulge of the protrusion 11A may have to be limited to avoid interference with the fixing bracket 16.

In contrast, in the present embodiment, the protrusion 11A and the fixing bracket 16 are in the positional relationship in which they do not interfere with each other. Thus, the size of the bulge of the protrusion 11A can be enlarged; and as a consequence, the mechanical strength of the first side frame 11 can be improved.

Since the second fixing part 16E is indirectly fixed to the first side frame 11 via the connecting collar 14B of the rear connecting member 14, the fixing bracket 16 can be easily fixed to the first side frame 11.

Since the rear connecting member 14 comprises the connecting rod 14A and the connecting collar 14B, the rear connecting member 14 can be used for cushion frames with various specifications by merely replacing the connecting collar 14B.

Other Embodiments

Although the belt anchor 15 according to the aforementioned embodiment is fixed to the fixing bracket 16 by welding, the present disclosure is nevertheless not limited to this configuration. For example, the belt anchor 15 may be fixed to the fixing bracket 16 by press fitting; or the belt anchor 15 may be an anchor bolt and bolted or screwed into the fixing bracket 16.

Although the first side frame 11 in the aforementioned embodiment comprises, in its lower end area, the protrusion 11A that protrudes to bulge towards the second side frame 12, in other words, towards the nuts N1, the present disclosure is nevertheless not limited to this configuration.

For example, the first side frame 11 does not have to comprise the protrusion 11A. Also, the protrusion 11A may protrude from the first side frame 11 towards the first plate-surface 16B (leftwards in FIG. 4, but not shown).

Although the cushion frame 10 according to the aforementioned embodiment is fixed to the conveyance via the sliding devices 7L and 7R, the present disclosure is nevertheless not limited to this configuration. For example, the cushion frame 10 may be directly fixed to a floor panel or other parts of the conveyance.

Although the second fixing part 16E according to the aforementioned embodiment is indirectly fixed to the first side frame 11 via the rear connecting member 14, the present disclosure is nevertheless not limited to this configuration.

For example, the second fixing part 16E may be directly fixed to the first side frame 11 by welding. In this case, the front end of the fixing bracket 16 may also be fixed to the first side frame 11 by welding.

Although the fixing bolts B1 and the nuts N1 in the aforementioned embodiment are situated in the same side of the first side frame 11 as the second side frame 12 is, the present disclosure is nevertheless not limited to this configuration. For example, the fixing bolts B1 and the nuts N1 may be situated in the same side of the first side frame 11 as the second fixing part 16E is.

Although the rear connecting member 14 according to the aforementioned embodiment comprises the connecting rod 14A and the connecting collar 14B, the present disclosure is nevertheless not limited to this configuration. For example, the rear connecting member 14 does not have to comprise the connecting collar 14B.

The aforementioned embodiments describe examples of the present disclosure used in a conveyance seat of a passenger car. Nevertheless, utilization of the present disclosure is not limited thereto. The present disclosure can also be utilized for seats of other automobiles as well as for seats of other conveyances such as railway vehicles, vessels, and aircrafts.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A cushion frame mounting in a conveyance, the cushion frame comprising:
   a first side frame that is disposed in a first width-end side of a seat and extends along a front-rear axis of the seat;
   a second side frame that is disposed in a second width-end side of the seat and extends along the front-rear axis of the seat;
   a connecting member that extends along a seat-width axis and couples the first side frame to the second side frame;
   a fixing bracket that comprises:
      a first fixing part that is coupled to a conveyance, and
      a second fixing part that is coupled to the first side frame; and
   a belt anchor that is disposed in the fixing bracket and coupled to a seat belt,
   the first fixing part comprising a first plate-surface that is substantially parallel to the seat-width axis,
   the second fixing part comprising a second plate-surface that is substantially perpendicular to the first plate-surface and is situated in the opposite side of the second side frame across the first side frame,
   the second fixing part being indirectly coupled to the first side frame via the connecting member, and
   the belt anchor being disposed in the second fixing part.

2. The cushion frame according to claim 1, wherein a mechanical fastener couples the first fixing part to the conveyance and is situated in the same side of the first side frame as the second side frame is situated.

3. The cushion frame according to claim 1, wherein the first side frame comprises, in a lower end area of the first side frame, a protrusion that protrudes towards the second side frame and extends along the front-rear axis of the seat.

4. The cushion frame according to claim 1, wherein the connecting member comprises
   a connecting rod that indirectly or directly couples the first side frame to the second side frame; and
   a connecting collar that is coupled to a first end of the connecting rod and couples the second fixing part to the first side frame.

5. The cushion frame for a conveyance seat according to claim 1, wherein a center of the connecting member is situated lower than a center of the belt anchor.

6. A cushion frame mounting in a conveyance, the cushion frame comprising:
   a first side frame that is disposed in a first width-end side of a seat and extends along a front-rear axis of the seat;
   a second side frame that is disposed in a second width-end side of the seat and extends along the front-rear axis of the seat;
   a connecting member that extends along a seat-width axis and couples the first side frame to the second side frame;
   a fixing bracket that comprises:
      a first fixing part that is coupled to the conveyance, and
      a second fixing part that is coupled to the first side frame;
   a belt anchor that is disposed in the fixing bracket and coupled to a seat belt; and
   a mechanical fastener coupling the first fixing part to the conveyance and being located at a position to a side of the first side frame that is facing the second side frame,
   the first fixing part comprising a first plate-surface that is substantially parallel to the seat-width axis,
   the second fixing part comprising a second plate-surface that is substantially perpendicular to the first plate-surface and is situated in the opposite side of the second side frame across the first side frame, and
   the belt anchor being disposed in the second fixing part.

7. The cushion frame according to claim 6, wherein the mechanical fastener is entirely beyond the first side frame in a direction towards the second side frame.

8. The cushion frame according to claim 6, wherein the first side frame comprises, in a lower end area of the first side frame, a protrusion that protrudes towards the second side frame and extends along the front-rear axis of the seat.

9. The cushion frame according to claim 6, wherein a center of the connecting member is situated lower than a center of the belt anchor.

* * * * *